United States Patent [19]
Schrimshaw

[11] 3,760,167
[45] Sept. 18, 1973

[54] PHASE JITTER SPECIAL PURPOSE COMPUTER

[75] Inventor: Rex A. Schrimshaw, Tampa, Fla.

[73] Assignee: Honeywell Information Systems Inc., Waltham, Mass.

[22] Filed: Mar. 16, 1972

[21] Appl. No.: 235,230

[52] U.S. Cl. .................... 235/151, 325/42, 325/65, 333/18, 340/172.5
[51] Int. Cl. .................... H04b 1/10, H04b 3/04
[58] Field of Search .................... 235/151, 181; 340/172.5; 444/1; 325/323, 324, 476, 42, 65; 333/17, 18, 70 T

[56] References Cited

UNITED STATES PATENTS

| | | | |
|---|---|---|---|
| 3,614,622 | 10/1971 | Holsinger | 333/18 X |
| 3,349,329 | 10/1967 | Crafts | 325/42 X |
| 3,505,593 | 4/1970 | Gram et al. | 333/18 X |
| 3,644,830 | 2/1972 | Ragsdale | 333/18 X |
| 3,660,761 | 5/1972 | Harmon et al. | 333/18 X |

*Primary Examiner*—Joseph F. Ruggiero
*Attorney*—Nicholas Prasinos

[57] ABSTRACT

A special purpose computer for correcting phase jitter of a communication channel. The computer performs a predetermined algorithm for estimating the phase jitter of the communication system and delaying the data signals so that their delay is equal to the carrier phase estimation delay at the point where the final carrier phase correction is applied.

15 Claims, 13 Drawing Figures

PHASE JITTER SPECIAL PURPOSE COMPUTER

BACKGROUND OF THE INVENTION

1. Field of the Invention

This invention relates generally to computers and more particularly to a special purpose computer which estimates and compensates for the time variant HF medium.

2. Description of the Prior Art

This invention relates to the invention of William F. Acker for a Phase Jitter Compensator application No. 228,551, filed on Feb. 23, 1972, and assigned to the same assignee as the instant invention. The application of Acker discloses a method and an apparatus for compensating phase jitter inherent in a communication channel. In the Acker invention the estimation for the proper phase correction is performed by a general purpose computer whereas in the instant invention a special purpose computer calculates the proper phase in order to compensate for phase jitter. However since general purpose computers are expensive and not generally available to everyone it is desirable to have a special purpose computer whose basic task is to solve a specific algorithm which can estimate a proper phase for demodulation.

SUMMARY OF THE INVENTION

Briefly, the invention herein disclosed comprises a low cost special purpose computer which performs a predetermined algorithm in order to calculate a proper phase for demodulation of a communication carrier.

OBJECTS

It is an object, therefore, of the instant invention to provide an improved low cost apparatus for calculating the phase jitter correction.

It is another object of the invention for correcting phase jitter by providing a low cost special purpose apparatus which takes into account the delay involved in estimating a proper phase for demodulation.

It is yet a further object of the instant invention to provide a low cost special purpose computer which essentially utilizes readily available circuit components.

It is still another object of the instant invention to provide a special purpose computer which features a low cost novel programmer.

Still another object of the invention is to provide a special purpose computer which features a low cost novel sign control unit.

Other objects and advantages of the invention will become apparent from the following description of the preferred embodiment of the invention when read in conjunction with the drawings contained herewith.

GENERAL DISCUSSION

The instant invention is a special purpose computer for estimating a proper phase for demodulation of a phase jitter corrupted signal. In the invention of William F. Acker for phase jitter compensator filed in the U. S. Patent Office on Feb. 23, 1972 and having a case no. 228,551, which patent application is assigned to the same assignee as the instant invention, there is disclosed a method and an apparatus whereby a proper phase for demodulation of a phase jitter corrupted signal is estimated and wherein the data signals of the modulated carrier are delayed so that their delay is equal to the carrier phase estimation delay at the point where the final carrier phase correction is applied. In the Acker invention, a general purpose computer is utilized to make the correction. Moreover, in the above subject patent application on pages 21 and 22 an algorithm is disclosed for providing a phase jitter compensated output for the in-phase data channel. The instant invention substitutes a special purpose computer for the general purpose computer to provide a phase jitter compensated output.

Figure 8:
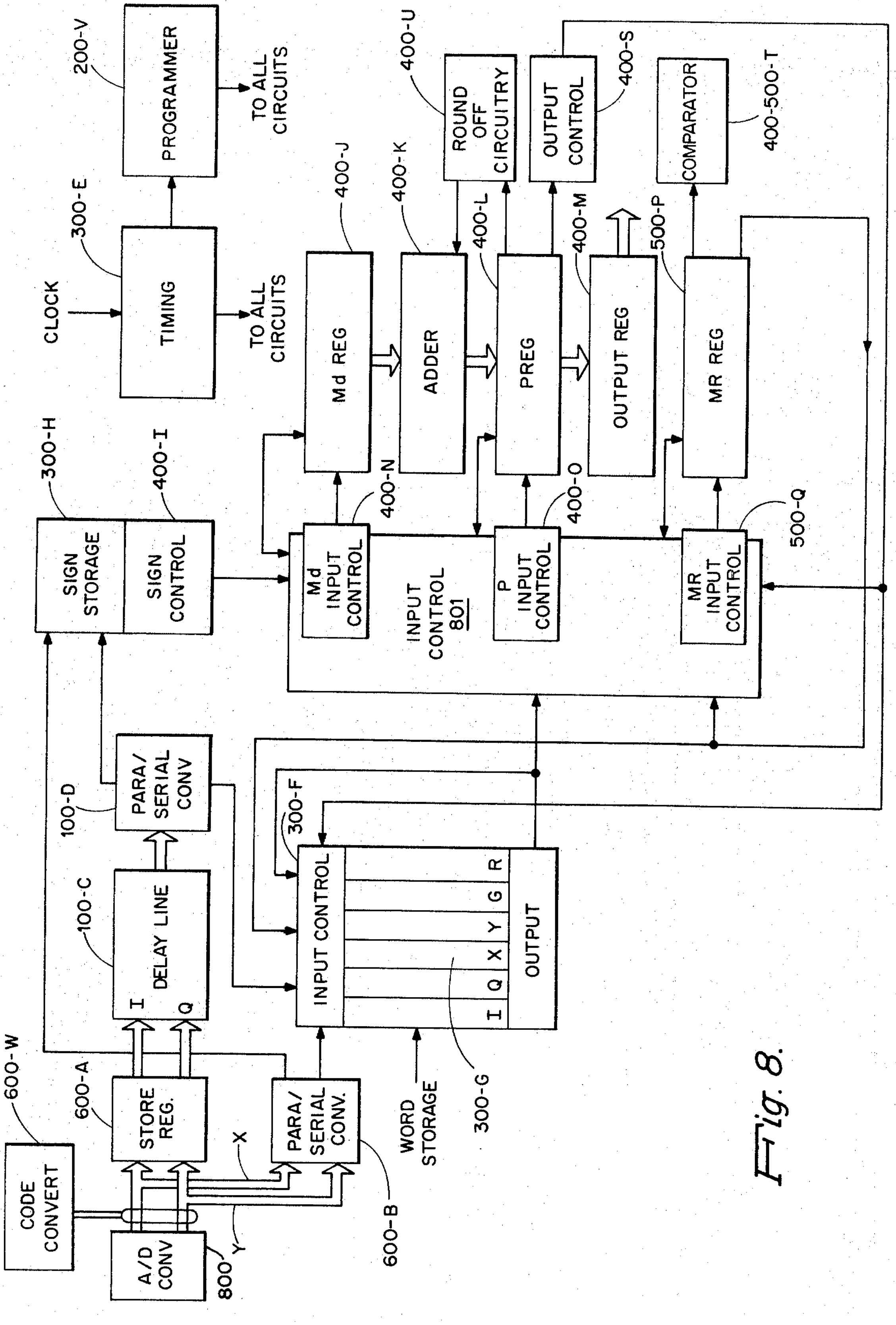
FIG. 8 is a block diagram of the overall architecture of the system of the invention.

Referring now to FIG. 8 of the instant invention an analog-to-digital (A/D) converter 800 corresponds to A/D converters 1111 and 1128 of FIG. 11 of the Acker application. Moreover, delay line 100-c of FIG. 8 of the instant application corresponds to delay lines 1112 and 1113 of FIG. 11 of the Acker application. In the Acker application however, the corrections represented by 1129 and the resolution of the proper angle is performed by a general purpose computer whereas these functions in the instant invention are performed by the special purpose computer which is the subject of the invention.

More specifically, the instant invention performs the following algorithm which is treated in the Acker application in greater detail.

1. $X \cdot Y = X^2$
2. $Y \cdot Y = Y^2$
3. $X^2 + Y^2 = R^2$
4. $G \cdot G = G^2$
5. $G^2/2$ (Shift Right 1 bit)
6. $(G^2/2 \cdot R^2 = E$
7. $3/2 - E = F$
8. $G \cdot F = K$ Reiterate;

9. $K \cdot K = K^2$
10. $K^2/2$
11. $K^2/2 \cdot R^2 = E'$
12. $3/2 - E' = F'$

13. $K \cdot F' = G'$

This $G'$ is the new $G$ when used again.

14. $X \cdot G' = C$

15. $Y \cdot G' = D$

16. $C \cdot I = I'$

17. $D \cdot Q = Q'$

18. $I' + Q' = S$

Do Step 18 twice.

19. AGC Functions (not described)

The symbolism is as follows:

$X$ = the digital value of the in-phase carrier output $Y$ = the digital value of the quadrature carrier output $I$ = the digital value of the in-phase data output which is properly delayed $Q$ = the digital value of the quadrature data output which is properly delayed $$G = [3/2 - (K^2 . R^2/2)]K - 1$$

The remaining symbolism used in this algorithm are derived quantities and are defined by their respective equations.

Referring now to FIG. 8 of the instant invention, a code converter 600-W is coupled to the A/D converters 800; the code converter 600-W receives binarily coded digital signals and converts them into a sign magnitude code. (Sign magnitude codes are discussed on pages 9, 10 and 12 of a book entitled *Introduction to Digital Computer Design*, by Herbert S. Sobel, published by Addison-Wesley Publishing Company, Inc. in 1970.) The output from code converter 600-W is applied to storage register 600-A and to parallel-to-serial converter 600-B. Storage register 600-A is a parallel-in and parallel-out storage register coupled to delay line 100-C for applying its output thereto. Parallel-to-serial converter 600-B is coupled to sign storage register 300-H and to input control unit 300-F. The most significant bit of the word processed through parallel-to-serial converter 600-B is a sign bit and is applied to the sign storage register 300-H and is not processed with the remaining bits of its word, but is used merely to indicate whether the remaining word is positive or negative. The magnitude bits of the word processed through parallel-to-serial converter 600-B is applied to the word storage device 300-G with the least significant bit first followed by the successive bits with the most significant bit being applied last. Delay line 100-C receives, in parallel, the in-phase digital data signals I and the quadrature data signals Q, and delays these data signals so that their delay is equal to the delay of the carrier phase estimation and applied at a time where the final carrier phase correction is made. (This delay is the subject of the Acker application identified supra.) The delayed digital data signals are applied in parallel to a parallel-to-serial converter 100-D which converts the parallel-in signals to serial-out signals and applies to the sign bit to storage register 300-H and the magnitude bits to word storage device 300-G. Word storage device 300-G is coupled and communicates directly or indirectly with parallel-to-serial converters 600-B and 100-D, input control device 300-F, and to $M_d$ register 400-J, P register 400-L, MR register 500-P through their input control circuitry 801. The working storage register 300-G stores words that are being processed as they become available for use in further processing. Referring to working storage register 300-G it will be noted that it has the capability to store in-phase and quadrature data words I and Q respectively, in-phase and quadrature carrier words, X and Y respectively, and G and R words which are the results of computations made during the processing and are defined in the algorithm given supra. Input control device 300-F controls the input of the storage registers in working storage device 300-G so that the proper words are placed in the appropriate register at the proper time.

Input control circuit 801 is comprised generally of $M_d$ input control 400-N, P input control 400-O, and MR input control 500-Q; they are coupled via input control 801 to working storage 300-G, input control 300-F and sign control 400-I. $M_d$ input control 400-N, controls the input signals to $M_d$ register 400-J, P input control 400-O controls the input signals to P register 400-L, and MR input control unit 500-Q controls the input signals to MR register 500-T. Basically the input control devices control the flow of traffic into and out of their respective registers and select the proper word to be placed in the appropriate register at the appropriate time. The timing and proper selection of registers for moving words from one storage location to another, and performing arithmetic or logic operations, is performed by timing unit 300-E and programmer 200-V.

The $M_d$ register 400-J and the P register 400-L are utilized in arithmetic processes such as multiplication, division, addition and subtraction. The information stored in the $M_d$ register 400-J is added or subtracted to or from the information in the P register 400-L by the adder 400-K and stored in the P register 400-L which acts as an accumulator. Since multiplication is over-and-over addition and division can be performed by shifting all of the arithmetic operations can be performed therein. It will be noted that the P register 400-L has the capability of being a serial-in-parallel-out register or a parallel-in-parallel-out register and this capability is controlled by the P-mode switch to be described infra. The MR register 500-P is a serial in-serial out shift register used to store a multiplier in a multiply process and communicates with the P register 400-L via the timing circuit 300-E. The $M_d$ register 400-J holds the multiplicand in a multiply process and directly communicates with the adder 400-K. The MR register also cooperates with comparator 400-500-T and other gating circuits to be described infra in order to control the magnitude of the signal G.

Output control device 400-S coupled to the P register 400-L and to the input control 300-F is a switch that picks one output at the end of an add operation and another output at the end of a multiply operation.

The round-off circuitry 400-U is coupled to the P register 400-L and to the adder 400-K, and is utilized for rounding off the least significant bit of the result in the P register. Basically, it is determined whether the least significant bit of the P register is a "one" or a "zero" and if it is a "one" then the contents of the P register are increased by "one" whereas if it is a "zero" the contents of the P register remain the same.

Details of FIG. 8 will be described infra utilizing FIGS. 1–7. In order to correlate FIG. 8 with FIGS. 1–7 more easily, the numbers together with their associated letters identifying various blocks on FIG. 8, have been chosen so that the first numeral of the number corresponds to a figure, and the letter corresponds to a general subsystem within that figure. For example, 600-W on FIG. 8 identifies readily the code converter which is to be found on FIG. 6 and is further identified by the letter W on FIG. 6. Therefore with FIG. 8 and with this identification scheme the various detailed drawings can be easily arranged to reproduce the total system.

DESCRIPTION OF THE DETAILED FIGURES

Figure 6:
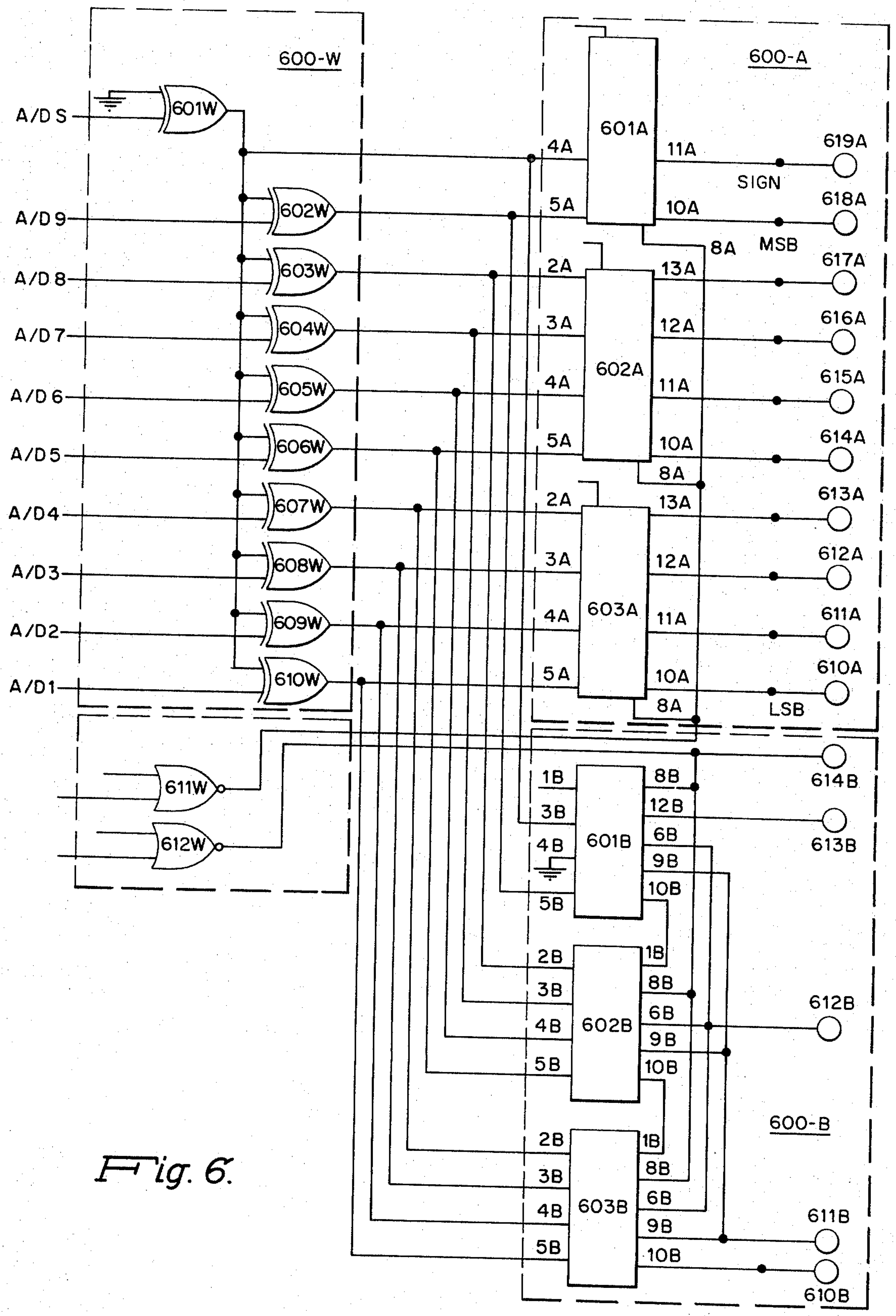
FIG. 6 shows logic block diagrams for the code converter, parallel-in parallel-out shift register, and a parallel to serial converter.

Referring now to FIG. 6 details of the code converter 600-W, storage registers 600-A and parallel-to-serial converter 600-B are shown. The code converter 600-W is comprised basically of exclusive-OR gates 601-W through 610-W. One of the inputs of each of exclusive-OR gates 602-W through 610-W is coupled to the output of exclusive-OR gate 601-W whereas the other input of exclusive-OR gates 602-W through 610-W is coupled to A/D converter 800 on FIG. 8. The exclusive-OR gate 601-W has one of its inputs grounded whereas the other one is coupled to A/D converter 800. (Each of exclusive-OR gates 601-W through 610-W may typically be of the type sold by Texas Instruments Inc. and identified as SN 7486N although other types of exclusive-OR gates may be utilized.) Basically the exclusive-OR gate performs the logic function $Y = A\bar{B} + \bar{A}B$ which is a statement that $Y$ is true if either $A$ or $B$ is true but not both.

Essentially the code converter 600-W converts a straight binary code into a sign magnitude code by examining the sign bit and allowing the magnitude bits to pass through the exclusive-OR gates intact when the sign bit from the A/D converter is zero, but inverts all the magnitude bits in passing through the exclusive-OR gates when the sign bit is a one. (For the purposes of the disclosure, zero sign bit is equivalent to a +3*a*. and a one sign bit is equivalent to a − sign.) The sign bit is applied to exclusive-OR gate 601-W and the output is applied to one of the inputs of exclusive-OR gates 602-W through 610-W. Hence, since one of the inputs of exclusive-OR gate 601-W is grounded or zero, the output of exclusive-OR gate 601-W will be high when the other input of exclusive-OR gate 601-W is a "one" or high. Therefore whenever a minus sign or a "one" is examined by exclusive-OR gate 601-W, a high output will result which is applied to each one of exclusive-OR gates 602-W through 610-W. Therefore, if a high signal or a "one" appears on the other input terminal of each of exclusive-OR gates 602-W a low output or a zero will result on the output terminal of that exclusive-OR gate. But, on the other hand, if a "zero" is applied to the second input of each of exclusive-OR gates 602-W through 610-W when a high or a one output will result at the output of each of exclusive-OR gates.

The output signals from code converter 600-W are applied to a parallel-in parallel-out storage register 600-A and to parallel-to-serial converter 600-B. Parallel-in parallel-out storage register 600-A is comprised of parallel-in parallel-out shift registers 601-A, 602-A, and 603-A which typically may be of the SN 7495N type manufactured by Texas Instruments Inc. although other types may be used. Similarly, parallel-to-serial converter 600-B is comprised of parallel-in serial-out shift registers 601-B, 602-B and 603-B of the same type referred to above. Operation of these shift registers as N-BIT parallel-to-serial converters and N-BIT storage registers is described in pages 9–17 of the Integrated Circuits Catalog CC201, Published by Texas Instruments, Inc., August 1969. Moreover, by referring to the TI catalog (Texas Instruments Catalog) on page 9–17 there is shown a schematic of the type shift register used in the invention with the various input and output pins being assigned pin numbers 1–14. In the instant application, the same pin numbers have been retained but an identifying letter has been added to each pin utilized in the application to relate it to the proper subsystem. For example, the output of exclusive-OR circuit 602-W is applied to a pin 5A of shift register 601-A and also to pin 5B of shift register 601-B. Hence, an inspection of FIG. 6 taken with the identified TI devices clearly shows the interconnections of the various components. It can readily be observed therefore, for example, that the sign bit from exclusive-OR gate 601-W is applied to pin 4A of storage register 600-A and is also applied to pin 3B of parallel-to-serial converter 600-B. The most significant magnitude bit from exclusive-OR gate 602-W is applied to pin 5A of storage register 600-A and to pin 5B of parallel-to-serial converter 600-B. Similarly in descending order the remaining bits of code converter 600-W can be traced. The output terminals 610A through 618A of storage register 600-A provide the magnitude bits with output terminal 610A providing the least significant magnitude bit (LSB) and with output terminal 618A providing the most significant magnitude bit (MSB) while output terminal 619A provides the sign bit. In parallel-to-serial converter 600-B the serial output is taken from output terminal 610-B with the least significant bit being taken out first followed successively by greater magnitude bits. 611-B is the serial block; 612-B is the mode control ($\overline{T1A + 20A}$); 613-B is the sign bit (SIIs); and 614-B is the parallel clock.

Figure 1A:
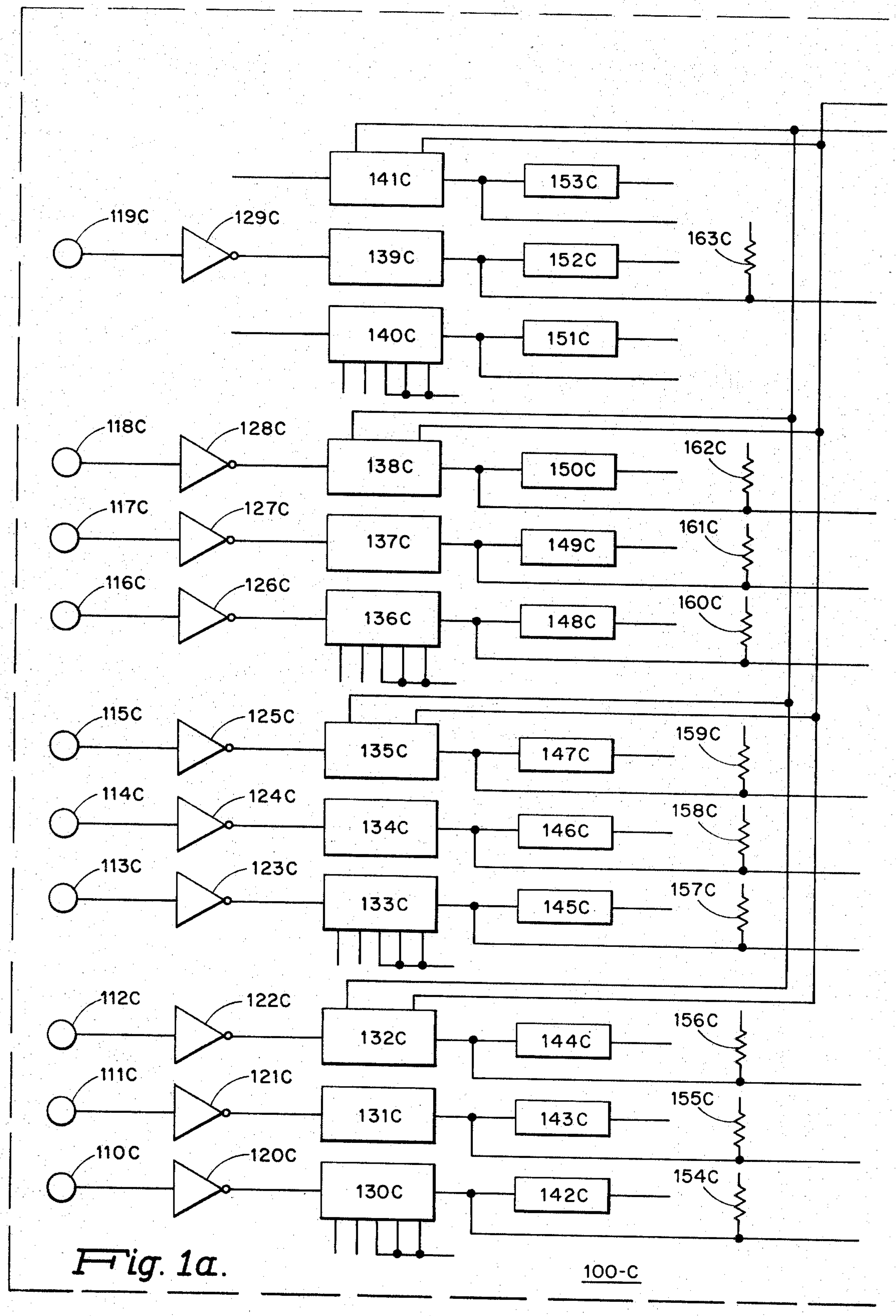
FIGS. 1*a* and 1*b* show a logic block diagram of the delay line and the parallel-to-serial converter utilized in a preferred embodiment of the invention.
Figure 1B:
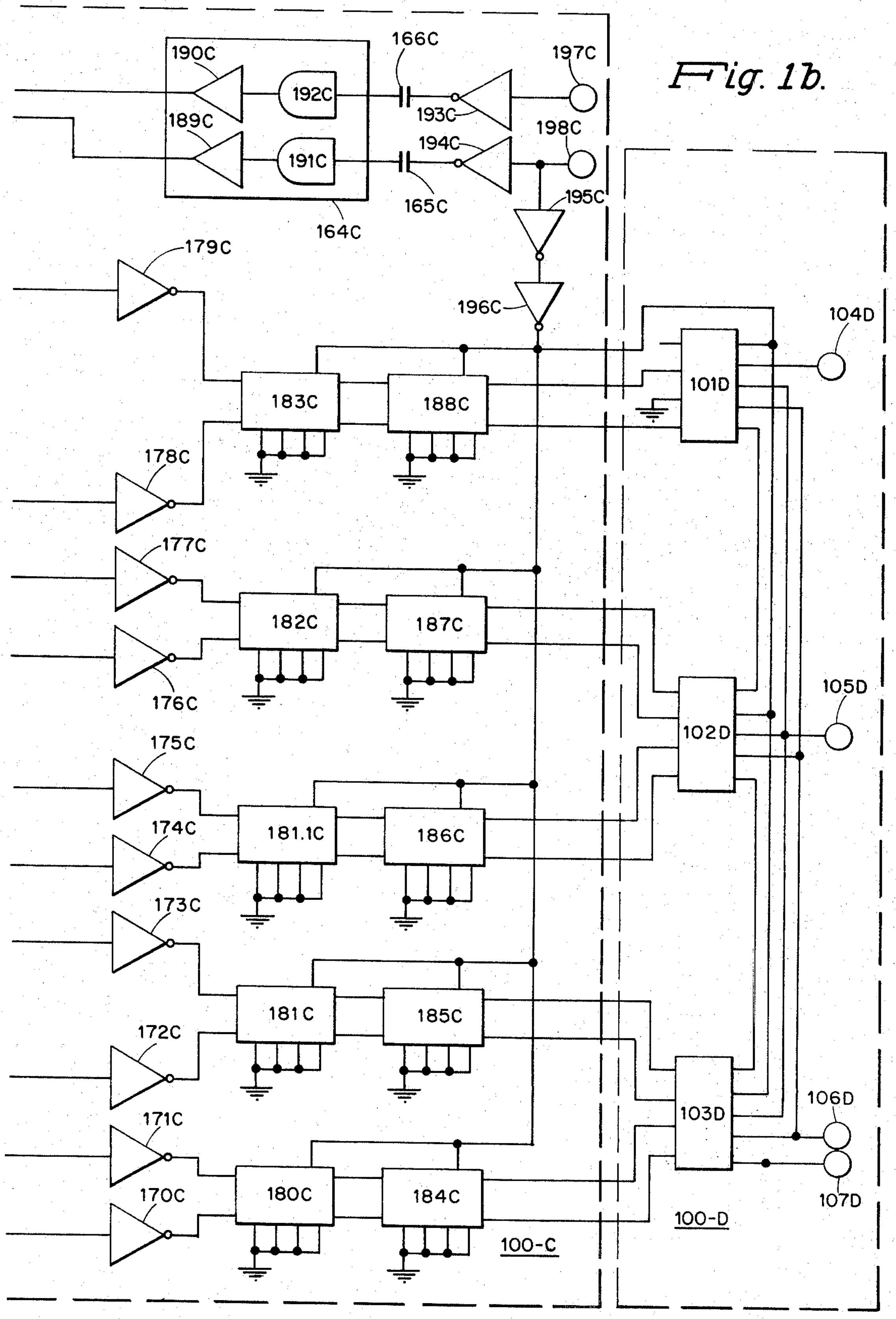

Referring now to FIGS. 1*a* and 1*b*, the details of delay line 100-C are shown. The input terminals of the delay line 100-C of FIG. 1*a* correspond to the output terminals of storage register 600-A of FIG. 6. For example, storage register 600-A has output terminals 610A through 619A whereas delay line 100-C has input terminals 110C through 119C with output terminals 610A corresponding to input terminal 110C, output terminal 611A corresponding to input terminal 111C, etc. Hence, it is observed that each of these terminals handles one bit of a 10 bit parallel word. Coupled to each of input terminals 110C through 119C is an inverter which may be of a TI type SN 7404N. These inverters are primarily used to isolate the inputs of the shift registers 130C–140C. Each of said inverters 120C through 129C inverts its respective input signal and applies it to its respective shift register coupled to it. The shift registers 130C through 139C are each coupled to respective ones of said inverters and are 60 bit MOS shift registers and may be of a type MM 5015 manufactured by National Semiconductor although other types may be utilized. 142C–153C are additional delays and are internally connected to 130C–141C. Resistors 154C–163C are used to allow the MOS devices 130C–141C to drive the TTL devices 170C–179C.

Inverters 170C through 179C are coupled at the output of respective ones of shift registers 130C through 139C and may also be TI type SN 7404N. Their object is to restore the inverted input signal back to its original state by reinverting the output of the MOS shift registers. Coupled to every two inverters 170C through 179C are dual eight-bit shift registers 180-C through 183-C each of which is coupled to respective ones of other eight-bit dual shift registers 184-C through 188-C. (Dual eight-bit shift registers 180C through 188C may be of the type manufactured by Fairchild Semiconductor Corporation and designated as type 9328, although other types may be utilized.) The delay line 100-C is comprised in toto, therefore, of the 60-bit shift registers 130C through 139C, the eight-bit shift registers 180C through 183C, and finally the eight-bit shift registers 184C through 188C. Therefore each 10-bit word flows horizontally through delay line 100-C with each bit flowing in parallel, and is delayed a total of 76 bits. Control circuitry to be described infra causes the alternate flowing of I data words and Q data words, i.e., a 10-bit parallel I word is followed by a 10-bit parallel Q word which in turn is followed by a 10-bit parallel I word, etc. The MOS shift registers are controlled by a two-phase clock driver which may be an NH009C type manufactured by National Semiconductor Corporation. Basically one phase of the clock provides signals for clocking information into the MOS shift registers and another phase provides signals for clocking information out of the MOS shift registers. Inverters 194C, 193C, 195C and 196C are TI type SN 7440N and invert a signal applied to terminals 197C AND 198C. 198C + 197C are terminals for applying clock or timing signals.

The major function previously described with respect to FIG. 8 of the delay line 100-C is to store the I and Q data channels and delay them for the required amount of time so that when they finally are applied to the *X* and *Y* carrier channels they all enter phase jitter correction circuitry at essentially the same relative time one with the other. (See also previously identified application of Acker, U.S. Pat. No. 228,551, filed Feb. 23, 1972.)

The parallel output signals from delay line 100-C are applied to a parallel-in serial-out converter 100-D. Converter 100-D operates essentially the same as converter 600-B previously described with respect to FIG. 6 and converts the parallel signal comprising the I and Q data words into serial output signals. The converter is comprised essentially of parallel-in serial-out shift registers 100D through 103D which are TI (Texas Instrument) type SN 7495N although other types may be utilized with the serial output obtained at terminal 107D. 104D is the sign bit output (SIs); 105D is the mode control ($\overline{T1A} + \overline{20A}$); and 106D is the serial clock.

Figure 3A:
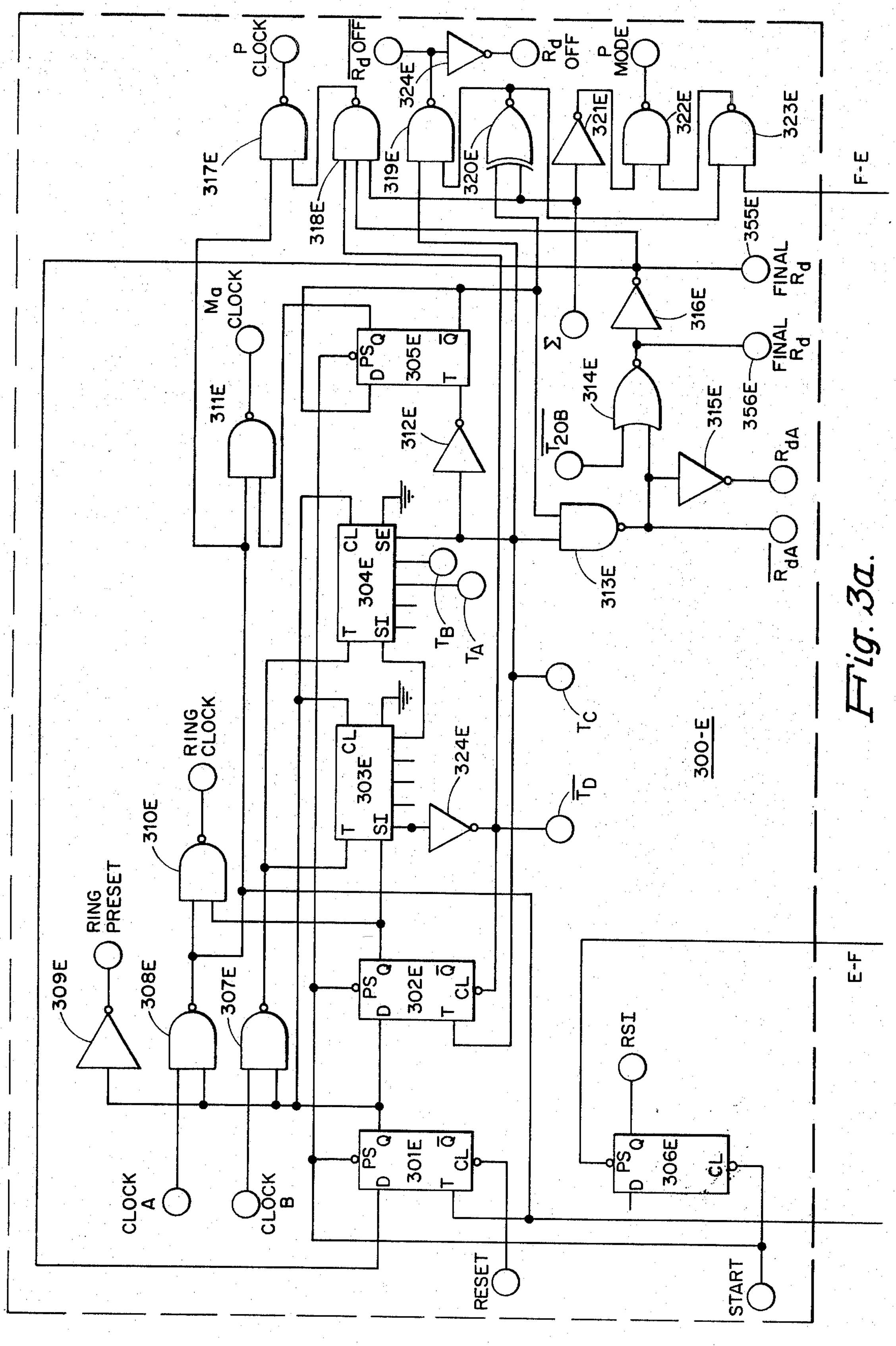
FIGS. 3*a* and 3*b* show logic block diagrams of the timing clock, the input control, the word storage device and the sign storage device utilized in a preferred embodiment of the invention.
Figure 3B:
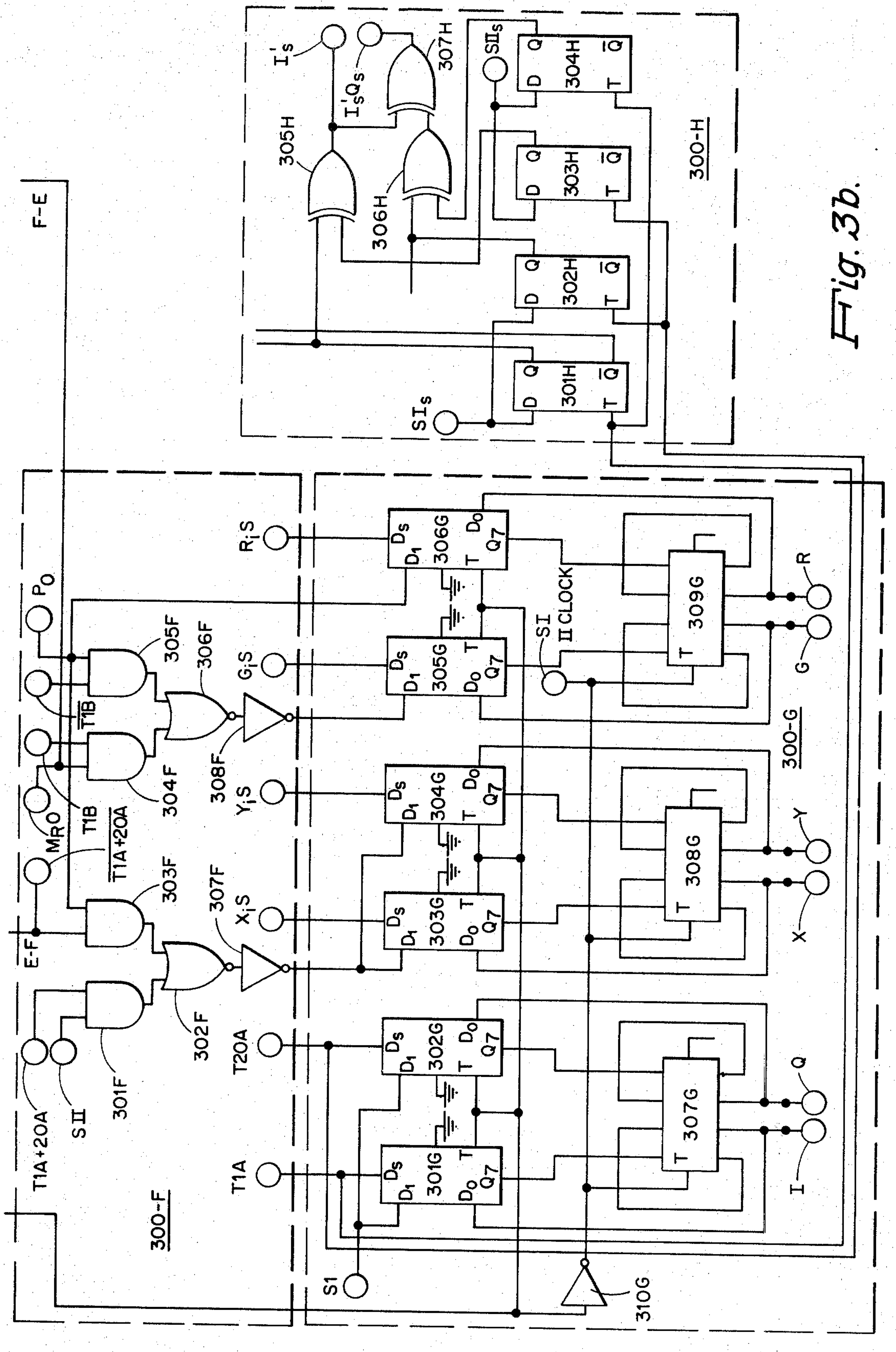

Referring now to FIGS. 3a and 3b there is shown a more detailed block schematic of timing network 300-E, input control network 300-F, working storage network 300-G and sign storage network 300-H.

Timing network 300-E sets up the basic timing for the entire phase jitter computer and provides a clock for programmer 200-V to be described infra. Basically, clock pulses CLK A and CLK B are provided to five bit shift registers 303E and 304E coupled as a ring counter through NAND gates 308E and 307E. (The five-bit shift register may be TI SN 7496N and NAND gate 307E may be a TI SN 7400N whereas NAND gate 308E may be a TI SN 7440N.) Also coupled to a five-bit shift registers 303E and 304E is NAND gate 310E which may be a TI type SN 7400N, and bistable latch circuits 301E, 302E, 305E, and 306E which may be TI types SN 7474N. Inverter 324E is coupled between one terminal of five-bit shift register 303E and the clear line on flip-flop 302E to insure only one "1" signal in the shift register 303E and 304E. Signal $T_c$ is the feed back to flip-flop 302E to allow continuous operation of the shift register 303E and 304E. ANAND gate 311E has one of its input terminals coupled to the output terminal of NAND gate 308E whereas another of its input terminals is coupled to latch circuit 305E; the output terminal of NAND gate 311E is coupled to $M_d$ CLK terminal. Coupled to the fifth output terminal of shift register 304E and to the $\overline{Q}$ terminal of latch circuit 305E is NAND gate 313E, which has its output terminal coupled to the $\overline{R_d A}$. Also coupled to the output terminal of NAND gate 313E is NOR gate 314E (which may be a TI type NS 7402), and an inverter 316E. NAND gate 317E has one of its input terminals coupled to the output of NAND date 308E another of its input terminals coupled to the output of NAND gate 318E whereas its output is the P CLK. NAND gate 318E has one of its input terminals coupled to the output of inverter 324E, another of its input terminals coupled to the output terminal of inverter 316E whereas a third input terminal is coupled to an input terminal of exclusive-OR gate 320E and an input terminal of inverter 321E, and input terminal $\epsilon$. NAND gate 319E has one of its input terminals coupled to the $T_c$ terminal of shift register 304E whereas another of its input terminals is coupled to the output terminal of exclusive-OR gate 320E. The output terminal of NAND gate 319E provides the $\overline{R_d OFF}$ and through inverter 324E provides $\overline{R_d}$OFF. Exclusive-OR gate 320E has one input terminal coupled to the output terminal of flip-flop 305E whereas another of its input terminals is coupled as described supra. The output terminal of exclusive-OR gate 320E is coupled to input terminals of NAND gates 319E and 323E respectively. NAND gate 322E has one input terminal coupled to the $\epsilon$ terminal through inverter 321E and another of its input terminals is coupled to the output terminal of NAND gate 323E. Its output terminal provides the P mode signal. NAND gates 323E has an input terminal coupled to an output terminal of exclusive-OR gate 320E, another input terminal coupled to the output of the MR register 502P and its output terminal is coupled to the P mode terminal through NAND gate 323E. Various input and output terminals provide input and output timing signals as shown on FIG. A.

Basically, the timing circuit provides the timing pulses for the appropriate timing of the invention by essentially recirculating a pulse through five-bit shift registers 303E and 304E for 40 times. Appropriate pulses are provided at the terminals indicated on FIG. 3*a* and further graphically illustrated on FIG. 7*a* and 7*b*. For example, a start pulse on a start terminal presets latch circuits 301E, 302E and 306E and permits a "1" to be applied to the first cell of shift register 303E with all zeros being applied to the remaining cells of shift registers 303E and 304E. The "1" is shifted successively under control of the clock pulses until it reached the fifth cell of shift register 304E whereupon it is once again circulated as described supra. This process continues until the $\overline{T20B}$ pulse appears on the input terminal of gate 314E which provides an enabling signal to final round terminal 355E which in turn provides the necessary pulse at terminal D of latch circuit 301E to stop the process.

At the end of every *B* timeperiod, a round A signal is generated. It is provided by gating the output of flip-flop 305E, which keeps track of A and B time periods, with the output of the last cell of the ring counter, 304E. Gate 313E actually does this gating. This pulse is used to clear the $M_d$ register, 401J and 402J, and to generate the signal Final Round.

At the end of the entire operation of all these circuits, a final round signal is needed to change the internal nine-bits + sign word to a eight-bit + sign word. This final round signal is generated by 314E gating RdA and T20B. This generates a final round signal at the end of T20B.

Figure 7A:
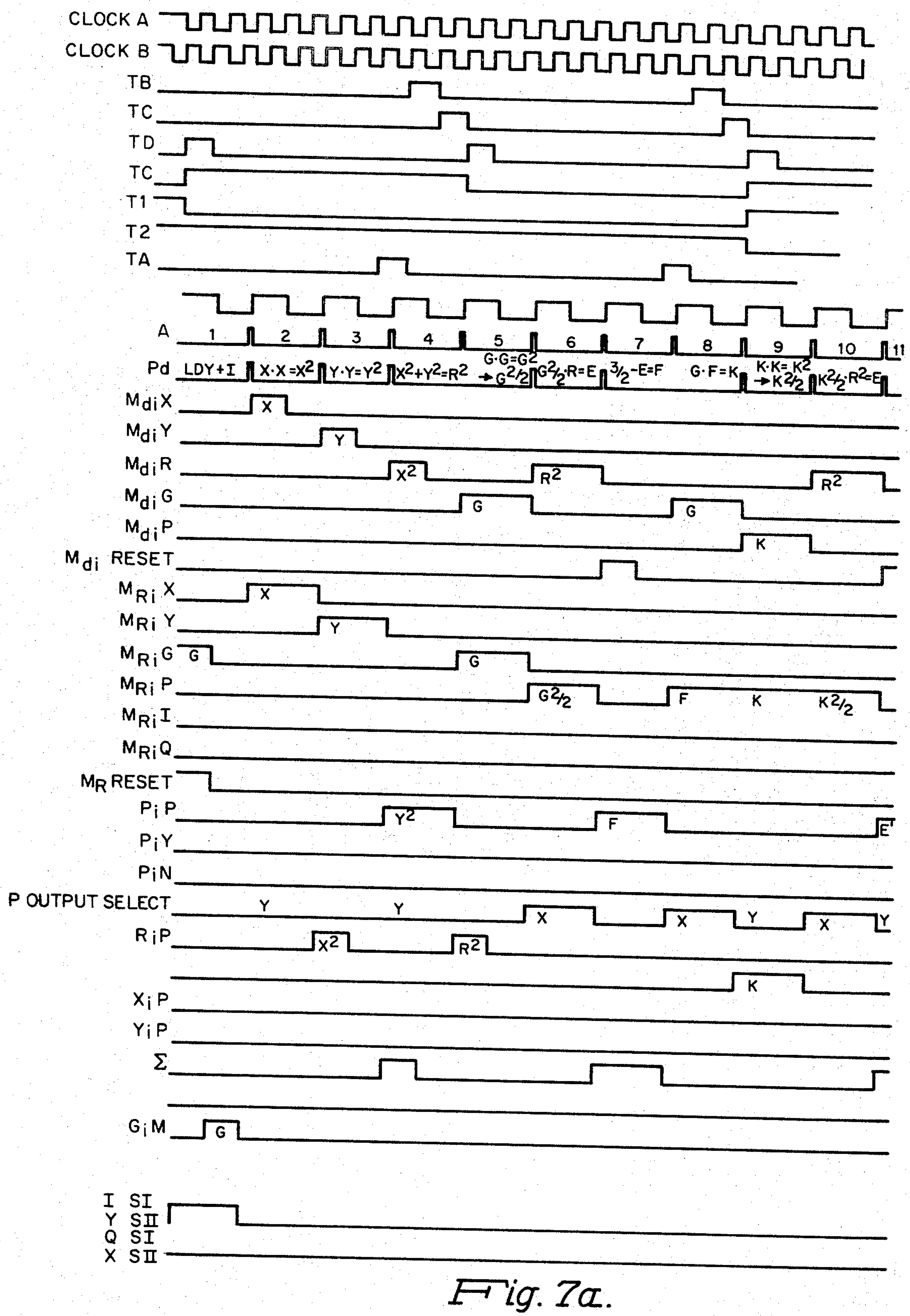
FIGS. 7a and 7b show the timing diagrams of the timing clock, and the programmer.

The RING PRESET and RING CLOCK signals are utilized to control the ring counter on programmer 200-V. The P mode signal controls the P register so that it can operate either as a parallel-in, parallel-out register or a serial-in, parallel-out register. The $T_A$, $T_B$, $T_C$ and $T_D$ signals shown on both FIGS. 3a and 7a are utilized as clocks in sections 400I and 500T. They are used when a signal must move at some time other than the start or finish of an A or B time.

RSI - Serial Input of Programmer Shift Register — It is generated by shifting a "O" into the programmer. Shift register, 201U, and then using T1 to change 306E back to a "1" until the next start time.

$M_d$ CLK is a train of ten pulses every A time. To be described infra. Generated with gate 311E.

$\epsilon$ is a signal generated by gate 227 and described the times addition or subtraction is taking place.

$R_d$OFF generated by gate 319E and inverter 324E describe the time a round off operation is needed by circuits 400U to be described infra.

Referring now to input control circuit 300-F there is shown AND gated 301F and 303F coupled to NOR gate 302F so as to provide an AND-OR-INVERT function similar to that provided by TI SN 7451 device. Similarly, AND gates 304F and 305F are coupled to NOR gate 306F to provide a similar function. Inverters 307F and 308F coupled to NOR gates 302F and 306F respectively provide an additional inverting function. The main objective of input control unit 300-F is to control the input to storage register 300-G, to be described infra by manipulating the input $B_d$ of shift registers 301-G through 306G of storage unit 300-G. For example, enabling signals coincidently present on either of AND gates 301F and 303F would enable NOR gate 302F and provide a low input to inverter 307F which in turn provides a high output to input terminals $D_1$ of shift registers 303G and 304G. Whether shift register 303G or shift register 304G is enabled to permit an input would depend on the presence or the absence of signals Xis or Yis at the $D_s$ terminal. Therefore, by providing the proper pulse from the programmer circuit 200U coincidentally with new information on the D1 input, a new word is permitted to enter a shift register, whereas if no pulses are coincidentally present then the information stored in the shift register will circulate therein.

Figure 7B:
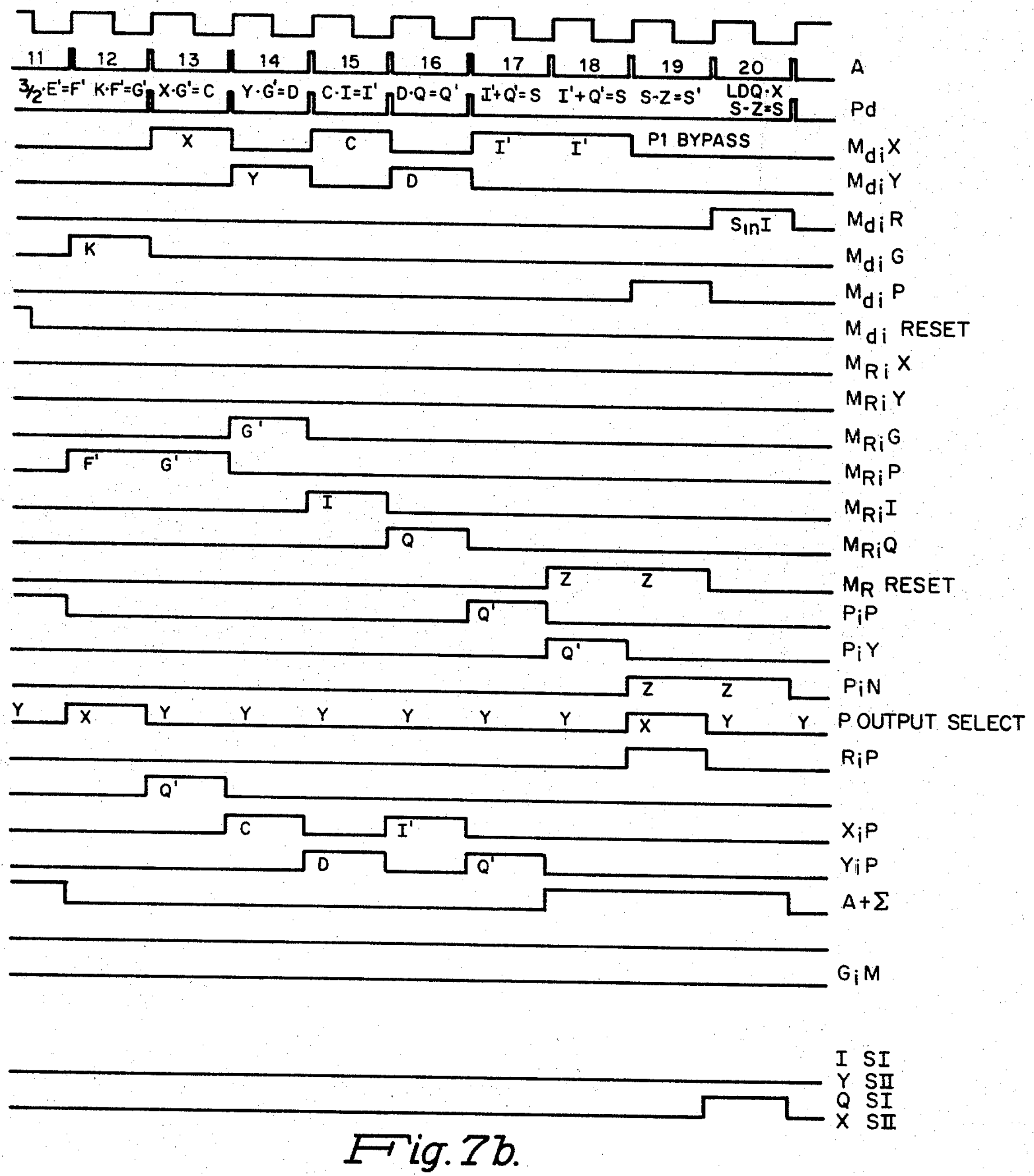

Referring once again to input control unit 300-F the following pulses have the following functions:

Signals T1A, T20A, XiS, YiS, GiS, and RiS are generated by the programmer 200-U and control the inputs to the shift registers 301G-306G. Their relationship is shown in FIGS. 7a and 7b.

Signals SI, SII, MrO, and PO are the outputs of shift register 100-D, shift register 600-B, shift register 500-P, and shift register 400-L respectively. These registers generate the words that will be stored in shift registers 300-G.

Referring now specifically to word storage unit 300-G there is shown six Fairchild 9328 type dual eight-bit shift registers 301G–306G. Coupled one each to pairs of shift registers 301G–302G, 303G–304G, 305G–306G are shift registers 307F, 308G, and 309G respectively. One eight-bit shift register coupled with a half of a four-bit shift register provides storage for one 10-bit word. For example, the I word is normally applied to shift register 301G at input terminal $D_1$ and is abstracted at terminal 12′ of shift register 307G and applied to output terminal I. Similarly, 10-bit words Q, X, Y, G, and R are stored in word storage unit 300–G.

SI, SII block generated by inverter 310F is also used as a serial block by shift registers 600-B and 100-D.

Referring now to sign storage network 300-H there is shown four D-type flip-flops 301H–304H. Flip-flops 301H and 304H have their T terminal coupled to the $T_{1A}$ input terminal and flip-flops 302H and 303H have their T terminal coupled to the $T_{20A}$ input terminal. The D terminal of flip-flops 301H and 302H are coupled to input terminal $SI_s$; the D input terminal of flip-flops 303H and 304H are coupled to input terminal $SII_s$.

The Q terminals of flip-flops 302H and 304H respectively are coupled to respective input terminals of exclusive-OR gate 306H whereas the Q terminals of flip-flops 301H and 303H are coupled to respective input terminals of exclusive-OR gate 305H. The output of exclusive-OR gate 305H is coupled to termianl $I'_s$ whereas the output of exclusive-OR gate 306H is coupled to one input terminal of exclusive-OR gate 307H whereas the other input terminal of exclusive-OR gate 307H is coupled to the output of exclusive-OR gate 305H. The output of exclusive-OR gate 307H is coupled to $I'_s$ $XQ_s$ terminal.

Sign storage unit 300-H stores the sign bit of words coming from the A/D converter while the remainder of the word is being processed. Flip-flop 301H stores the sign bit for the I word, flip-flop 302H stores the sign bit for the Q word, flip-flop 303H stores the sign bit for the X word and flip-flop 304H stores the sign bit for the Y word. The three exclusive-OR gates are utilized to form the product of the sign that is used to determine the final sign of the output. The I and Q sign bit is applied to flip-flop 301H and 302H respectively through input terminal $SI_s$ whereas the X and Y sign bits are applied to flip-flops 303H and 304H through input terminal $SII_s$. Terminals $I'_s$ and $I'_sQ_s$ are the output terminals for the sign storage section 300-H. It will be noted that since the Q terminals of flip-flop 301H-304H are exclusive-OR together that the output attained at the output $I'_sQ_s$ is the effective multiplication of these two terms together.

The action in the P register 400-L is controlled by the P mode signal generated by gate 322E and by the P clock signal generated by gate 317E. During A time period P mode forces the P register into serial in operation. P clock generates ten clock pulses allowing a new word to be read serially into the P register. During a multiply operation in time B, P clock generates ten clock pulses and P mode causes serial or parallel input into the P register dependent upon the contents of the MR register. During an add operation, the P clock generates two clock pulses. One for the add operation and one for round off. The P mode signal at this time stays in parallel input model.

P clock is generated by gate 307E. Its inputs are a high speed clock from gate 308E and an inhibit function gate 318E. Gate 318E inhibits unwanted clock pulses during add time by inputs $T_o$, $T_c$, and $\epsilon$.

P mode gate 322E is controlled by gates 320E, 321E, 323E. During A time gate 322E is held low by gate 321E and 320E acting through gate 323E. During B time gate 321E controls 322E if an add operation and the MR register output controls the mode through gate 323E if a multiply operation.

Figure 2A:
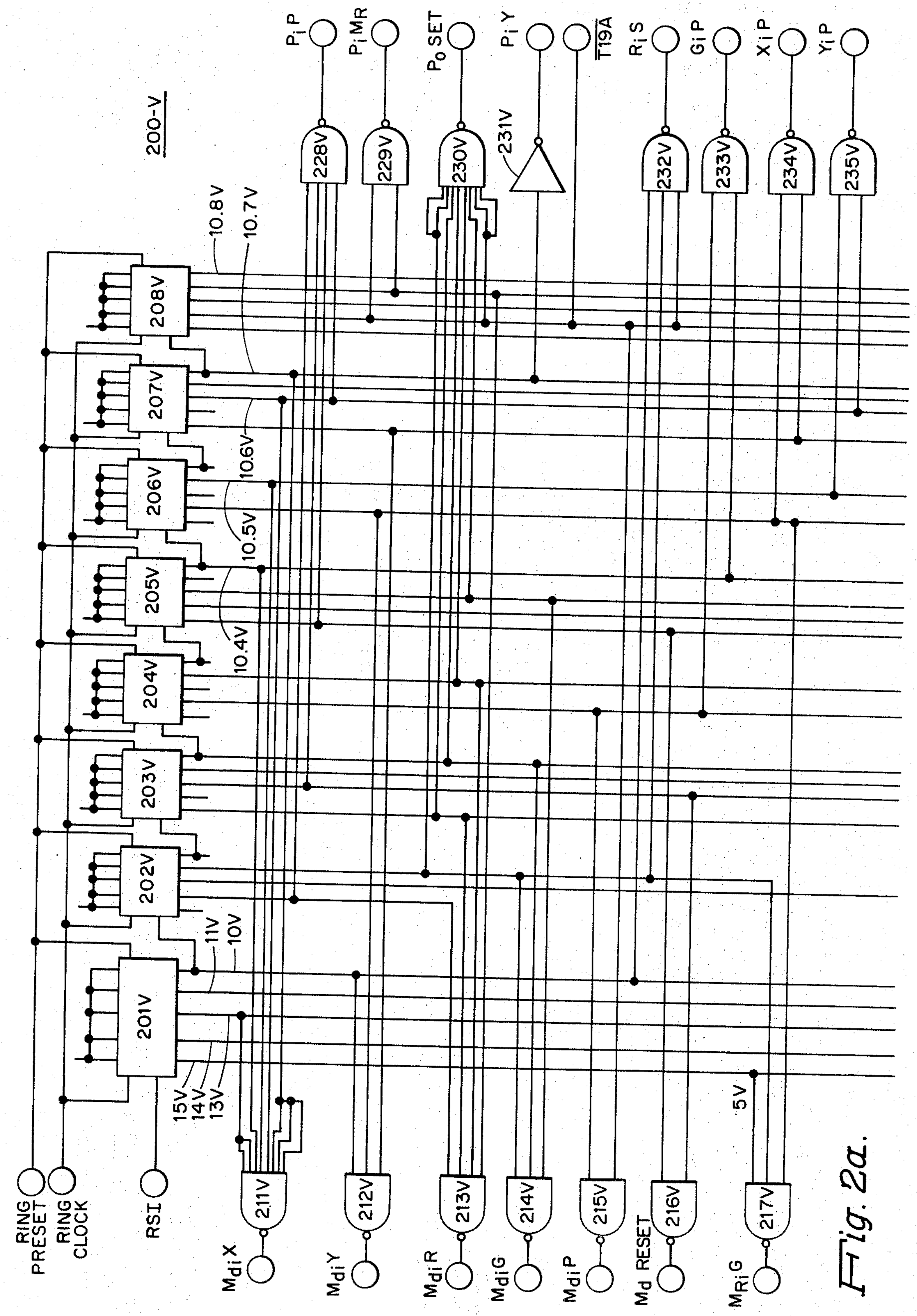
FIGS. 2*a* and 2*b* show a logic block diagram of the programmer utilized in a preferred embodiment of the invention.
Figure 2B:
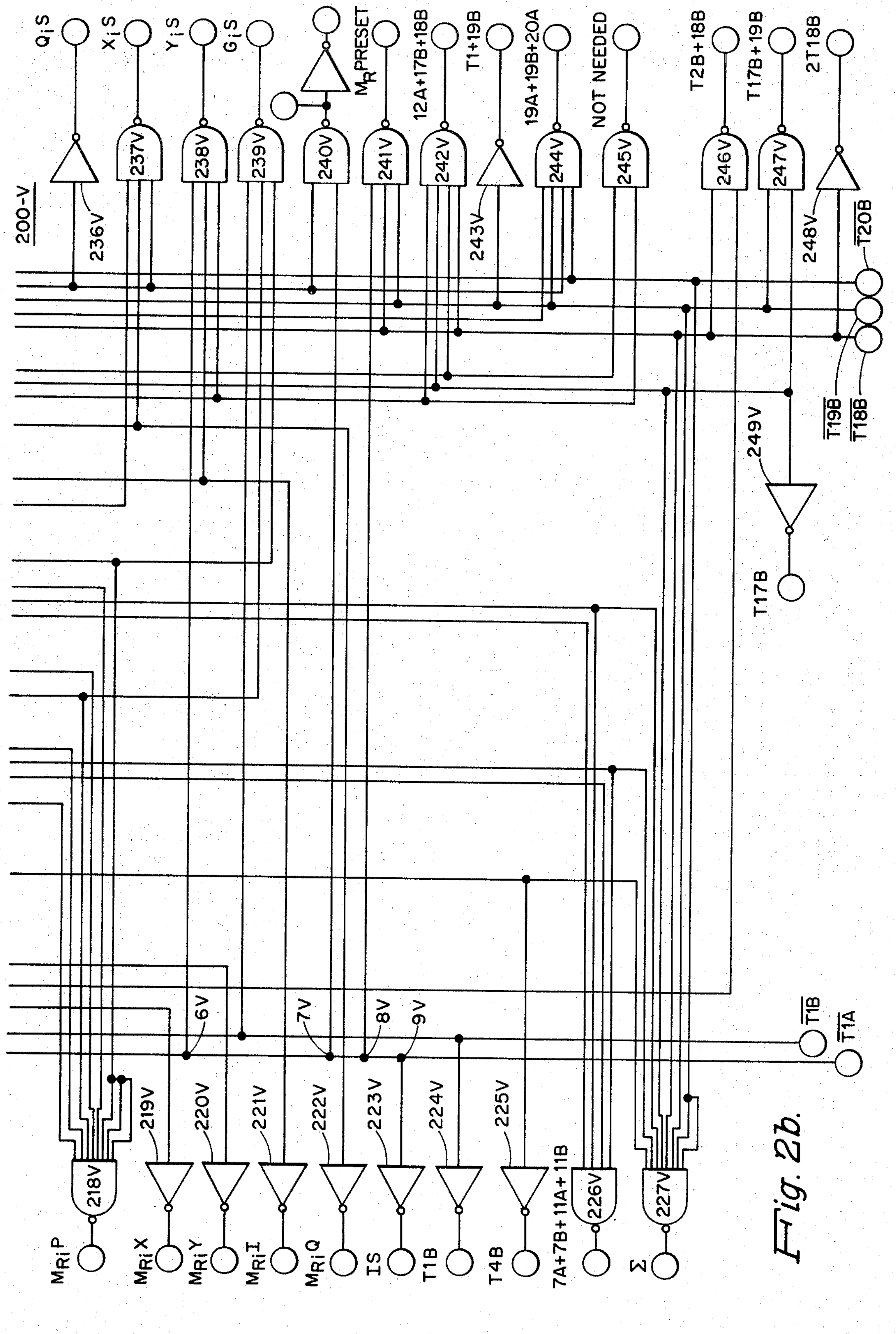

Referring now to FIGS. 2a, 2b, 7a and 7b, there is shown the programmer 200-V on FIGS. 2a–2b, and timing pulses derived from the programmer on the bottom three-quarter portion of FIGS. 7a and 7b. In the invention there are essentially 40 time periods which are divided equally and alternately into Class A and Class B time periods, thus giving 20 A time periods and 20 B time periods. During a time period A such functions requiring the moving of information from one device to another, or for storing information is performed whereas during a time period B arithmetic operations such as subtraction, division, etc., are performed. Hence the system has a total of 20 major time divisions each divided into A and B, although this is not specifically shown in the figures. Hence, in essense, there are available 40 time periods each of which may be used to perform a different operation. Examining FIGS. 7a and 7b further, it will be seen that there are many other graphs below graph A, eachof which has a different identification on the left-hand column of FIG. 7a. For example, there is shown $M_{dt}X$, $M_{dt}Y$, etc., which represent generally an operation that is performed when that particular identified pulse goes high. The signal name is also a mnemonic name which specifies a particular operation, i.e., $M_{dt}X$ means load the $M_d$ register from the X storage register or another way of saying it X register into $M_d$ register. As previously described time period A is for performing some loading or transfer operation, etc., whereas time period B is for performing some arithmetic operation. Hence in time period 2A, the $M_{dt}X$ signal is high and during this portion of the time period, the X register is loaded into the $M_{dt}$ register. During the second portion of time period 2B, CLK B is high and as shown in time division 2, X is multiplied by X to obtain $X^2$. A like procedure is used in each of the 20 time divisions. The apparatus for performing these operations is basically a timing circuit 300-E previously described and the programmer 200-V to be described infra.

Referring now to the programmer 200-V on FIGS. 2a and 2b, there is shown eight five-bit shift registers 201V-208V which may be TI type SN7496. The output terminals from each bit position of the shift registers 201V–208V are coupled to preselected ones of NAND gates 211V–218V, 226V, 227V, 228V–230V, 232V–235V, 237V–242V, 244V–247V; and also coupled to preselected ones of inverters 219V–225V, 231V, 236V, 243V, and 248V. (The NAND gates may be TI type as follows: SN7430N–211V, 218V, 230V; SN7410N–212V, 214V, 217V, 218V, 237V, 238V, 239V, 241V; SN7420N–213V, 228V, 242V, 244V; SN7400N–215V, 216V, 229V, 233V, 234V, 235V, 240V, 245V, 246V, 247V; SN496N –227V. Inverters may be TI type as follows: SN7404N–219V–225V, 231V, 236V, 243V, and 248V.)

In operation the 40-bit serial shift register comprised of the eight five-bit shift registers 201V-208V, is loaded with all "1's", i.e., all the bit output terminals such as 15V, 14V, 13V, 11V, 10V, of shift register 201V through and including the remaining output terminals of each shift register down to and including 10.8V output terminal of shift register 208V are high initially. A "0" or a low signal is then introduced to the 40-bit shift register 201V–208V and shifted under control of the RING CLK pulses. As successive terminals of the bit shift register become low, the NAND gates having at least one of their input terminals coupled to that bit output terminal will be enabled and thus provide an appropriate pulse for the performance of an appropriate operation in a pre-determined sequence. Thus, for example, NAND gate 211V will become enabled and provide a signal $M_{dt}X$ with termnals 13V of shift register 201V, terminal 10.4V of shift register 205V, terminal 10.5V of shift register 206V and terminals 10.6V and 10.7V of shift register 207V become successively low or a "zero" is present; since each is connected to NAND gate 211V this gate will be enabled and output a high signal when one of its inputs has a low signal thereon.

Figure 4A:
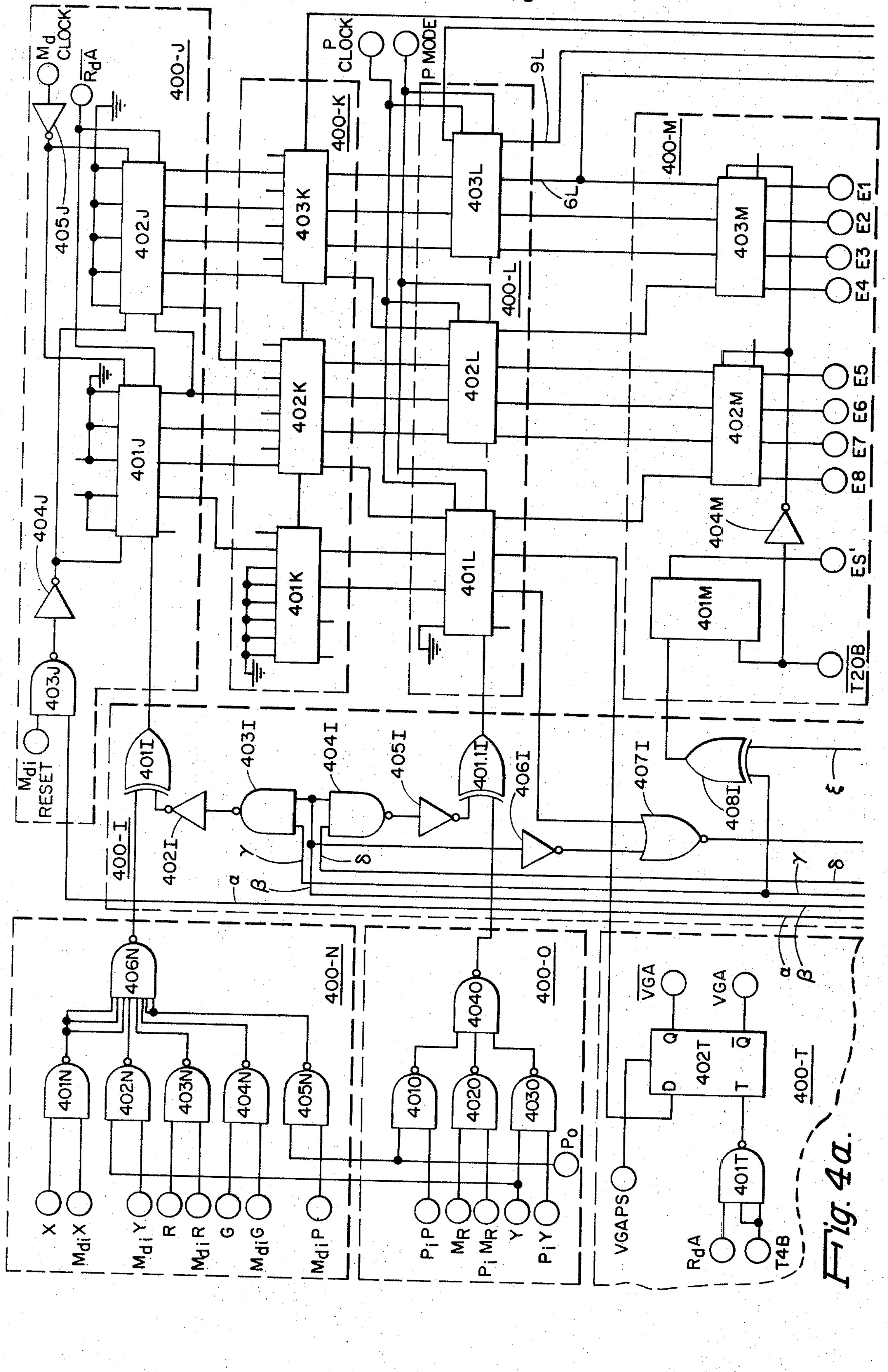
FIGS. 4*a* and 4*b* show logic block diagrams of the sign control unit, the $M_d$ register input control unit, the P register input control unit, the $M_d$ register, the adder, the P register, the output register, the round-off circuitry, the output circuitry, and a portion of the comparator unit all utilized in a preferred embodiment of the invention.
Figure 4B:
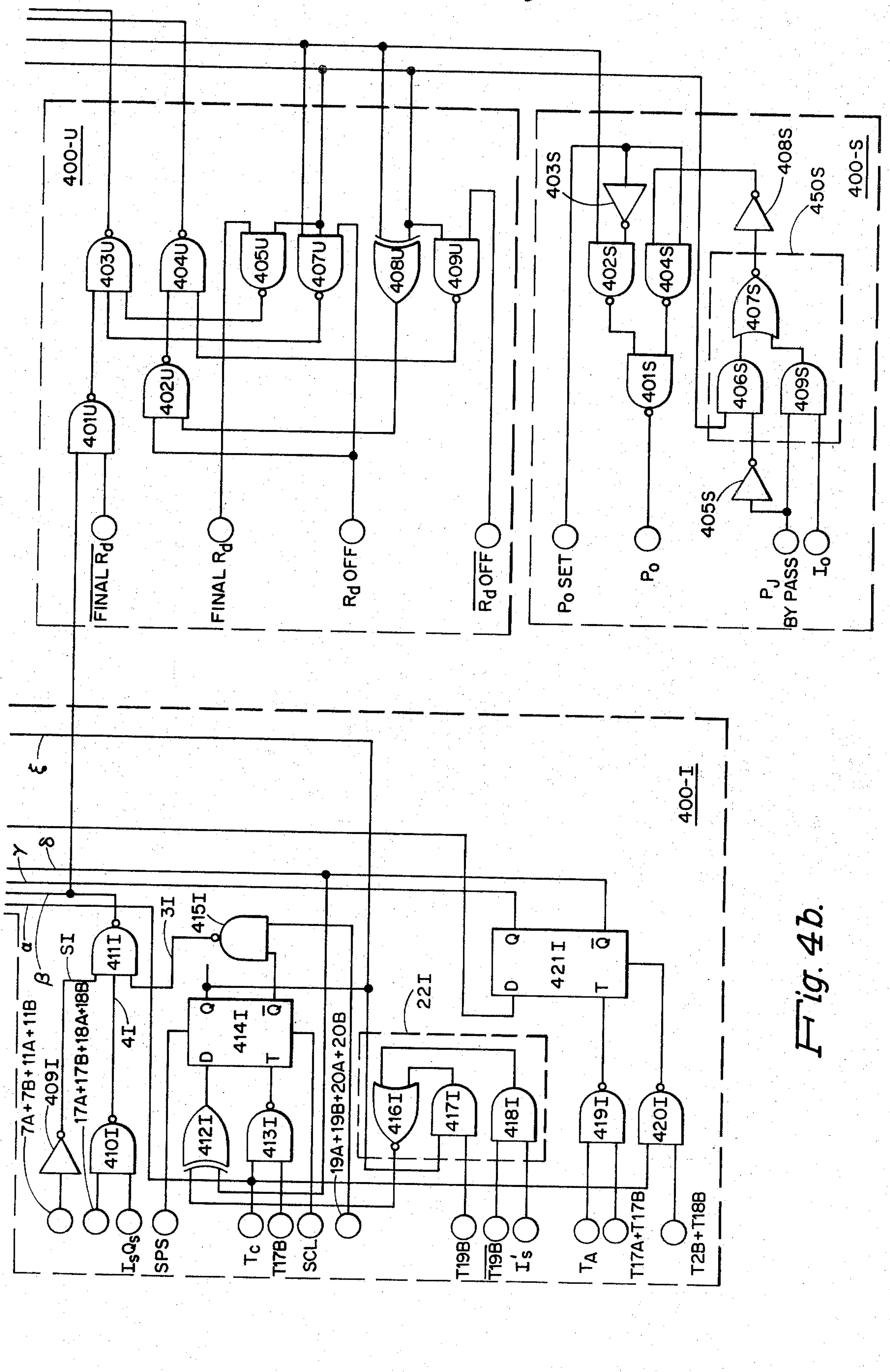

Referring now to FIGS. 4a and 4b there is shown details of the following circuits: $M_d$ register input control 400-N; P register input control 400-O; $M_d$ register 400-J; adder 400-K: P register 400-L; output register 400-M; round off circuit 400-U; output control 400-S; sign control 400-I; and comparator 400-T. Referring now in detail to $M_d$ input control 400-N there is shown NAND gates 401N-405N whose output is coupled to the inputs of NAND gate 406N. The $M_d$ input control circuit 400-N controls the application of the X, P, T, G, and R words into the $M_d$ resgister by concurrently applyimg through the input of the appropriate NAND gate the word and its associated operation signal. For example, to apply the X word into the $M_d$ register comprised of two five-bit shift registers 401J and 402J, NAND gate 401N is enabled when the X word is present concurrently with the $M_{dt}X$ signal from the programmer 200-V, on the input terminals of NAND gate 401N. When NAND gate 401N is enabled NAND gate 406N permits the X word to pass through exclusive-OR gate 4011 and into $M_d$ register 401J-402J. (The sign control of this word to exclusive-OR gate 4011 will be described infra.)

P register control circuit 400-O is comprised of NAND gates 401O–404O, and operates similar to circuit 400-N to control the input to T register 400-L. Here as in circuit 400-N the control signals are taken from the programmer 200-V and the input words themselves are taken from word storage circuit 300-G.

Referring now to the $M_d$ register 400-J, the adder 400-K and the P register 400-L, two TI type SN7496N serial-in parallel-out shift registers 401J–402J comprise the $M_d$ register 400-J, three TI type SN7483 four-bit binary full adders 401K-403K comprise the adder 400-K, and three TI type SN7495 parallel-in parallel-out shift registers 401L–403L comprise the P register 400-L. In operation the $M_d$ register 400-J runs off the $M_d$ CLK signal provided through inverter 405J by $M_d$ clock shown on FIG. 3a. Inputs to the $M_d$ register 400-J are through exclusive-OR gate 4011 and are controlled by $M_d$ input control 400-N as described supra. The $M_d$ register 400-J generally holds the multiplicand in the multiplication process and performs multiplication by over-and- over addition by applying this information to adder 400-K which performs a parallel addition with the information stored in P register 400-L and stores the result in the P register, which in this instance would be acting as an accumulator. Similarly, addition and subtraction arithmetic processes are performed utilizing the adder 400-K whose function is to add or subtract a parallel word in the $M_d$ register and the P register together and apply the sum or difference back into the P registor. The P register is not only a parallel-in parallel-out register but may act as a serial-in parallel-out register under the control of the P mode switch. In the A time period (previously discussed) the input to the P register is always serial; however, in the B time period the input is controlled by the P mode switch, being either parallel or serial depending upon the particular arithmetic operation to be performed at the time. The output from the P register normally passes through output control circuitry 400-S. This circuit is comprised of a TI type SN7451 two-input AND-OR-INVERT gate 450S, and three TI type SN7400N two-input positive NAND gates 401S, 402S and 404S. It will be observed that one output in P register 400-L is applied to the input of AND-OR-INVERT gate 450S whereas another output is applied to the input of NAND gate 402S which in turn has its output coupled to output terminal $P_0$ through NAND gate 401S. NAND gate 404S has its output also coupled to output terminal $P_0$ through NAND gate 401S and also has one of its input terminals coupled to the output of AND-OR-INVERT gate 405S through inverter 408S. Thus it can be readily seen that the output from the P register can be selected from either position 9L or 6L under the control of the output control unit 400-S. This is necessary since some operations as for example operation 5 in the previously defined algorithm, the result in the P register must be divided by 2 by shifting one position to the right; when this occurs the output is selected from the 9L output pin of P register 400-L. This operation is under the control of the programmer 200-D which provides the proper signals. The NAND-OR-INVERT gate 450S is also utilized as a by-pass gate by substituting the I word at the $P_0$ output terminal under the control of the $P_j$ by-pass signal so that the input $I_0$ passes directly to the output $P_0$ without being processed.

Flip-flop 401M and shift register 402M, 403M store the output of the special purpose computer for use where needed. The register is filled at time $\overline{T20B}$ every complete cycle.

In round-off circuitry 400-U during a multiply operation the contents of the P register 400-L are added back into the adder 400-K shifted one place to the right. Thus the running sum stored in the P register has only the 10 most significant bits of the partial product. During the first nine clocks of the B period, the second least significant bit is gated by NAND gate 404U and 409U back into the P register 401L–403L as the new least significant bit. On the last clock of the B period, round off time, the two least significant bits are added by gates 408U and 407U. The output of gate 408U becomes the new LSB and if both bits were "1"s. a carry is generated into adder 400K.

In an add operation, the equivalent of round off occurs through gates 401U, 403U, and 407U.

At the end of time 20 B, our nine-bit word in the P register 400-L is rounded off to eight bits. This is accomplished in the same manner as round off except with the signal final round and using gates 405U and 401U.

Referring now to sign control network 400-I of FIGS. 4*a* and 4*b*, there is shown the circuitry that determines whether addition of subtraction is to be performed during time divisions 7, 11, 17, 18, 19 and 20 which call for an addition or subtraction operation. Referring to FIGS. 7*a* and 7*b* time divisions 17 and 18, for example, indicate an addition; however, if one sign of the operators to be added is negative the actual operation performed is a subtraction. Whether to perform addition or subtraction operation is determined mainly by two D flip-flops 414I and 421I. Flip-flop 414I is a sign storage flip-flop and stores the sign of the operation to be performed whereas flip-flop 421I is utilized as a complement flip-flop and together with flip-flop 414I and exclusive-OR gates 401I and 401. 1I taken together with their apurtenant NAND gates and inverters 415I, 411I, 403I, 401I, 404I, and 405I permit the input information into $M_d$ or P register 400-J and 400-L respectively to be true or complemented depending on whether addition or subtraction is to be performed. The addition or subtraction operation is performed twice but only one answer is provided at the output. The reason for performing the operation twice is that it is not feasible to determine at the outset which register should be complemented in a subtract operation. Hence is a subtract is called for on the first pass, the information into the $M_d$ register is permitted to pass through unaltered whereas the information into the D register is complemented and then an algebraic addition is performed. If an overflow occurs, then this condition is detected by OR gate 406 which changes the state of flip-flop 421I so that in the second try the information into the $M_d$ register is inverted whereas the information in the P register is brought in unaltered and then an algebraic addition operation is performed which would then in fact be the true answer for the subtraction. If on the other hand no oerflow occurs, then flip-flop 421I does not change state and the first operation is repeated again, i.e., the information into $M_d$ register is brought in unaltered whereas the information into the P register is inverted and the information in the two registers is then algebraically added in the adder 400-K. To illustrate this in greater detail, assume that a minus sign is stored in flip-flop 414I. This sign is applied at terminal $I'_s$ through a TI Type SN7451N AND-OR-INVERT gate 22I and exclusive-$\overline{OR}$ gate 412I to flip-flop 414I. A minus sign causes the $\overline{Q}$ terminal of flip-flop 414I to be high. Assuming that this is time slot 17 the signal applied to terminal 19A plus 19B plus 20A plus 20D will be low and hence the output of NAND gate 415I will be high. This high signal is applied to NAND gate 411I at input terminal 3I and another high signal is applied to NAND gate 411I at input terminal 5I. NAND gate 410I has one input terminal 17A + 17B + 18A + 18B high since we are operating in time period 17 and moreover the other input terminal $I_sQ_s$ which inputs the sign to NAND gate 410I is also high (since we have assumed we are going to subtract and as previously noted we have adopted the convention that a minus sign is represented by a "1" at high whereas a plus sign is represented by a "0" at low in this embodiment). Both inputs to NAND gate 410I are high, its output is low and this output is applied to the input 4I of NAND gate 411I. With input terminals 3I and 5I of NAND gate 411I high and input terminal 4I of NAND gate 411I low, the output of NAND gate 411I is high. This high output of NAND gate 411I is applied to one input terminal B of NAND gate 403I. The other input terminal of NAND gate 403I which is coupled to the Q terminal of complementary flip-flop 421I is low. Hence with the B input terminal of NAND gate 403I high and with the input terminal of NAND gate 403I low, the output terminal of NAND gate 403I is high. The high signal from the output terminal of NAND gate 403I is applied to inverter 402I which inverts the signal and applies a low signal to one of the input terminals of exclusive-OR gate 401I. The data which is destined for $M_d$ register 400-J is applied to the other input terminal of exclusive-OR gate 401I. It can readily be seen that whenever a "0" is applied to the second input terminal of NAND gate 401I it is false and it outputs a low or "0" signal; whereas if a high or "1" is applied to the second input terminal of exclusive-OR gate 401I it is true and outputs a high signal or a "1." Hence under these conditions data enters the $M_d$ register in its true fashion. However performing the same analysis and tracing out the signals applied to exclusive-OR gate 401.1I, it will be observed that the data that is permits to pass through into the P register 400-L is inverted. This is simply because NAND gate 404I also has a B input terminal which is high, the second input terminal of 404I is $\delta$ instead of $\gamma$, and this $\delta$ input terminal is coupled to the $\bar{Q}$ terminal of complementary flip-flop 421I and is high. With two high inputs at NAND gate 404I a low output results and this low output is inverted at inverter 405I which in turn applies a high input signal to exclusive-OR gate 401I. With this high input signal a low input signal into NAND gate 401I will cause the gate to be enabled and a high or "1" signal results whereas with a "1" on the second input terminal or exclusive-OR gate 401. 1I, the gate is disabled and a low or "0" results. If however the wrong information was complemented an overflow results and this overflow is detected by NOR gate 407I which causes complementary flip-flop 421I to change state thus making the Q terminal high and the $\bar{Q}$ terminal low. Therefore with this condition, the information that enters the $M_d$ register 400-J is complemented whereas the information that enters the P register 400-L is not complemented. Hence on the second try the correct subtraction would result because of the addition of the correctly complemented information. If on the other hand the information was correctly complemented on the first try, no overflow would result and the complementary flip-flop 421I would not change state and hence on the second try the same operation would be performed as on the first try. Hence by performing the addition or subtraction operation twice, the system is self-checking and corrects itself.

Figure 5:
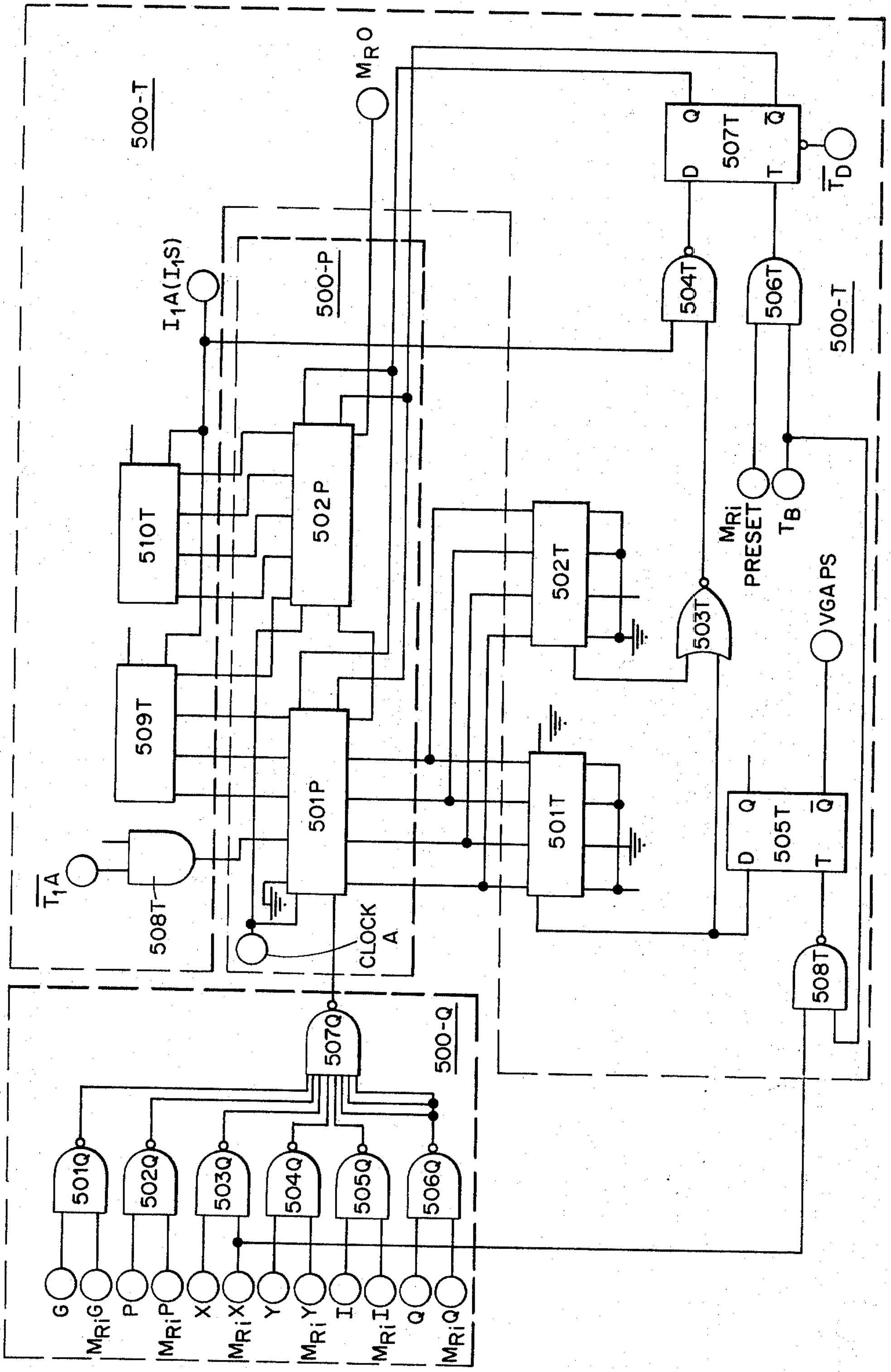
FIG. 5 shows logic block diagrams of the MR register input control unit, the MR register, and a portion of the comparator utilized in a preferred embodiment of the invention.

Referring now to FIG. 5, there is shown the MR register 500-P with its input control 500-Q; also shown in FIG. 5 is part of comparator 500-T where the other part of the comparator is shown on FIG. 4a and identified as 400-T. MR register 500-P is comprised of two 5-bit shift registers 501P and 502P with input information applied to them under the control of MR input control unit 400-Q. The MR input control unit 500-Q operates in a manner similar to the $M_d$ and P input control units 400-N and 400-O previously described. Briefly G, P, X, Y, I, Q information words are controllably applied to the MR register under control of $M_{Rt}G$, $M_{Rt}P$, $M_{Rt}X$, $M_{rt}Y$, $M_{Rt}I$, $M_{Rt}Q$ control signals provided by the programmer 200-V. Referring now to the comparator, part of which is shown on FIG. 5 as 500-T and part of which is shown on FIG. 4a as 400-T. In general the comparator cooperates with the MR register in order to control the amplitude of a variable gain amplifier (shown in the prior identified Acker application). Also the comparator checks the limits on the G signal by applying the G signal from word storage 300-G to MR register 500-T and comparing this word with comparators 501-T, 502-T which may be DM8200 type of comparator manufactured by National Semiconductor.

If the word in the MR register 500-P is within predetermined limits, no alteration is made to it; however, if the word falls out predetermined limits, a new word is read in parallel in MR register 500-P from TI type SN74H87 devices 509T and 510T. The output signals of comparators 501T and 402T are applied to the D flip-flop 505T and 507T either directly or through NOR gate 503T and NAND gate 504T respectively. The output of flip-flop 505T is applied to flip-flop 402T of the portion of the comparator 400-T shown on FIG. 4*a*. The flip-flop 402-T of comparator 400-T controls the variable gain amplifier (VGA) to which reference was previously made.

Flip-flop 507-T changes state when the signal G has exceeded its limits. This allows a new number, within limits, to be preset into the MR register 500-P and used as the new signal G.

What is claimed is:

1. A special purpose computer for performing a predetermined alogirthm and calculating a proper phase for demodulation of a communication carrier comprising:

a. working storage means for storing signals representative of in-phase and quadrature data words *I* and *Q* respectively, in-phase and quadrature carrier words *X* and *Y* respectively, and computed words *G* and *R* respectively;

b. programming-unit means coupled to said working storage means, said programming-unit means responsive to timing signals for providing a predetermined sequence of electronic signals for directing the execution of a predetermined algorithm;

c. calculating means coupled to said working storage register means and to said programming-unit means, said calculating means responsive to said programming-unit means for calculating the digital values *X* and *Y* representative of the in-phase and quadrature carrier output signals respectively; and d. delay means coupled to said working storage means for delaying the digital signals *I* and *Q* representative of the digital value of the in-phase and quadrature data output signals respectively;

e. code converter means coupled to said delay line and to said working storage means for converting binarily coded digital signals into sign magnitude coded signals.

2. A special purpose computer as recited in claim 1 including sign storage means coupled to said working storage register means for storing the sign value of a word being processed.

3. A special purpose computer as recited in claim 2 wherein said calculating means further comprise an adder, an Md register coupled to said adder and a P register coupled to said adder, said Md register for storing information for adding or substracting to or from the information stored in the P register, and said P register for storing the result of addition by said adder.

4. A special purpose computer as recited in claim 3 including an MR register coupled to said adder for storing a multiplier during a multiply process.

5. A special purpose computer as recited in claim 4 including round-off circuit means coupled to said P register and to said adder for rounding of the least significant bit of the information stored in the P register.

6. A special purpose computer as recited in claim 4 including a P-mode switch coupled to said P register and wherein said P register assumes a serial-in-parallel-out capability or a parallel-in-parallel-out capability under the control of said P mode switch.

7. A special purpose computer as recited in claim 4 including Md input control means coupled to said Md register, P input control means coupled to said P register, and MR input control means coupled to said MR register said Md, P and MR input control means for controlling the input signals to said Md, P and MR registers respectively.

8. A special purpose computer as recited in claim 7 including sign control means coupled to said sign storage means and to said Md, P and MR input control means for calculating the proper sign for the word being processed.

9. A special purpose computer as recited in claim 2 including variable gain amplifier means coupled to said delay means responsive to input signals for adjusting the gain of the output signals.

10. A special purpose computer for performing a predetermined algorithm and calculating a proper phase for demodulation of a communication carrier comprising:

a. working storage means for storing signals representative of in-phase and quadrature data words I and Q respectively, in-phase and quadrature carrier words X and Y respectively, and computed words G and R respectively;

b. programming-unit means coupled to said working storage means, said programming unit means responsive to timing signals for providing a predetermined sequence of electronic signals for directing the execution of the following algorithm, 1. $X \cdot X = X^2$
2. $Y \cdot Y = Y^2$
3. $X^2 + Y^2 = R^2$
4. $G.G = G^2$
5. $G^2/2$ (shift right 1 bit)
6. $(G^2/2) \cdot R^2 = E$
7. $3/2 - E = F$
8. $G.\ F = K$ reiterate, 9. $K.K = K^2$
10. $K^2/2$
11. $K^2/2 \cdot R^2 = E'$
12. $3/2 - E' = F'$
13. $K.\ F' = G'$ this $G'$ being the new $G$ when used again,

14. $X.G' = C$
15. $Y.G' = D$
16. $C.I = I'$
17. $D.Q = Q'$
18. $I' + Q' = S$ where $X$ = the digital value of the in-phase carrier output,
$Y$ = the digital value of the quadrature carrier output,
$I$ = the digital value of the in-phase data output which is properly delayed,
$Q$ = the digital value of the quadrature data output which is properly delayed,
$G = [3/2 - K^2.R^2/2]\ k{-}1$, and the remaining symbolism being derived quantities and defined by their respective equations;

d. and delay means coupled to said working storage means for delaying the digital signals $I$ and $Q$ representative of the digital value of the in-phase and quadrature data output signals respectively.

11. A special purpose computer as recited in claim 10 including code converter means coupled to said working storage means for converting binarily coded digital signals into sign magnitude coded signals.

12. A special purpose computer as recited in claim 11 including sign storage means coupled to said working storage register means for storing the sign value of a word being processed.

13. A special purpose computer as recited in claim 12 wherein said calculating means further comprise an adder, and Md register coupled to said adder and a P register coupled to said adder, said Md register for storing information for adding or subtracting to or from the information stored in the P register.

14. A special purpose computer as recited in claim 13 including an MR register coupled to said adder for storing a multiplier during a multiply process.

15. A special purpose computer as recited in claim 10 including a variable gain amplifier means coupled to said delay means responsive to input signals for adjusting the gain of output signals.

* * * * *